United States Patent
Kishiyama et al.

(10) Patent No.: US 9,042,299 B2
(45) Date of Patent: May 26, 2015

(54) MOBILE TERMINAL APPARATUS AND RADIO COMMUNICATION METHOD

(75) Inventors: Yoshihisa Kishiyama, Tokyo (JP); Teruo Kawamura, Yokosuka (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/261,490

(22) PCT Filed: Apr. 28, 2011

(86) PCT No.: PCT/JP2011/060378
§ 371 (c)(1),
(2), (4) Date: Nov. 20, 2012

(87) PCT Pub. No.: WO2011/136333
PCT Pub. Date: Nov. 3, 2011

(65) Prior Publication Data
US 2013/0114501 A1    May 9, 2013

(30) Foreign Application Priority Data

Apr. 30, 2010  (JP) .................................. 2010-105944
Aug. 16, 2010  (JP) .................................. 2010-181683
Oct. 4, 2010  (JP) .................................. 2010-225014

(51) Int. Cl.
*H04W 72/04* (2009.01)
*H04J 13/00* (2011.01)
(Continued)

(52) U.S. Cl.
CPC ......... *H04W 72/0406* (2013.01); *H04J 13/004* (2013.01); *H04J 13/0059* (2013.01);
(Continued)

(58) Field of Classification Search
CPC . H04W 72/0406; H04L 1/0073; H04J 13/004
See application file for complete search history.

(56) References Cited

U.S. PATENT DOCUMENTS

2007/0156677 A1*  7/2007  Szabo ................................ 707/5
2008/0091633 A1*  4/2008  Rappaport et al. ............... 706/50
(Continued)

FOREIGN PATENT DOCUMENTS

WO        2008/050467 A1      5/2008
WO    WO 2008132073 A1  *  11/2008
(Continued)

OTHER PUBLICATIONS

R1-081199_3GPP TSG RAN WG1 Meeting #52bis, presented in Shenzhen, China, Mar. 31-Apr. 4, 2008, by Panasonic and NTT DoCoMo, titled, "Necessity of the Scrambling for the Reference Signal of CQI in PUCCH", as Agenda Item_6.1.4, Uplink Control Signaling as a document for Discussion and Decision, pp. 01 to 06.*

(Continued)

*Primary Examiner* — Andrew Lai
*Assistant Examiner* — Hoyet H Andrews
(74) *Attorney, Agent, or Firm* — Osha Liang LLP

(57) ABSTRACT

A mobile terminal apparatus and a radio communication method are provided which can efficiently transmit feedback control information through a physical uplink control channel. The radio communication method according to the present invention uses a plurality of ACK/NACK control bits as data signals, adds cyclic shifts to a plurality of reference signal blocks of a plurality of time blocks in a physical uplink control channel format comprised of a plurality of time blocks, multiplies the plurality of reference signal blocks by orthogonal codes and transmits a control channel signal including reference signals by which orthogonal codes are multiplied to a radio base station apparatus through a physical uplink control channel.

11 Claims, 12 Drawing Sheets

(51) Int. Cl.
| | |
|---|---|
| *H04L 1/18* | (2006.01) |
| *H04L 1/16* | (2006.01) |
| *H04L 1/00* | (2006.01) |
| *H04L 1/12* | (2006.01) |

(52) U.S. Cl.
CPC ........... *H04J13/0074* (2013.01); *H04L 1/0026* (2013.01); *H04L 1/1854* (2013.01); *H04L 1/0073* (2013.01); *H04L 1/1671* (2013.01); *H04L 1/1692* (2013.01); *H04L 2001/125* (2013.01)

(56) References Cited

U.S. PATENT DOCUMENTS

| | | | | |
|---|---|---|---|---|
| 2009/0279493 | A1* | 11/2009 | Gaal et al. | 370/329 |
| 2009/0316811 | A1 | 12/2009 | Maeda et al. | |
| 2012/0127950 | A1* | 5/2012 | Chung et al. | 370/329 |
| 2012/0243497 | A1* | 9/2012 | Chung et al. | 370/329 |
| 2012/0269138 | A1* | 10/2012 | Han et al. | 370/329 |
| 2012/0287877 | A1* | 11/2012 | Han et al. | 370/329 |
| 2012/0307760 | A1* | 12/2012 | Han et al. | 370/329 |
| 2012/0327875 | A1* | 12/2012 | Han et al. | 370/329 |
| 2013/0044667 | A1* | 2/2013 | Han et al. | 370/311 |
| 2013/0136093 | A1* | 5/2013 | Han | 370/329 |
| 2013/0142161 | A1* | 6/2013 | Lee et al. | 370/329 |
| 2013/0155982 | A1* | 6/2013 | Gaal et al. | 370/329 |
| 2013/0195066 | A1* | 8/2013 | Lee et al. | 370/329 |
| 2013/0215803 | A1* | 8/2013 | Lee et al. | 370/280 |
| 2013/0215865 | A1* | 8/2013 | Lee et al. | 370/329 |
| 2013/0223301 | A1* | 8/2013 | Lee et al. | 370/281 |

FOREIGN PATENT DOCUMENTS

| | | |
|---|---|---|
| WO | WO 2008153350 A1 * | 12/2008 |
| WO | WO 2009020376 A2 * | 2/2009 |

OTHER PUBLICATIONS

R1-073541_3GPP TSG RAN WG1 Meeting #50, presented in Athens, Greece, Aug. 20-24, 2007, by Samsung, titled, "UL ACK/NACK channel structure", as Agenda Item_7.2.4, Document for Discussion and Decision, pp. 01 to 04.*

R1-073149_3GPP TSG RAN WG1 Meeting #49bis, presented in Orlando, USA, Jun. 25-29, 2007, Samsung, titled, "Cyclic Shift Hopping of UL ACK Channels", as Agenda Item_5.13.2, Document for Discussion and Decision, pp. 01 to 06.*

3GPP TS 36.211 V9.1.0 (Mar. 2010), Technical Specification, 3rd Generation Partnership Project; Technical Specification Group Radio Access Network; Evolved Universal Terrestrial Radio Access (E-UTRA); Physical Channels and Modulation (Release 9) on Mar. 2010, pp. 01 through 85.*

R1-081199, (hereinafter R1-081199), 3GPP TSG RAN WG1 Meeting #52bis, R1-081199, Shenzhen, China, Mar. 31-Apr. 4, 2008, Source: Panasonic, NTT DoCoMo; Title: Necessity of the Scrambling for the Reference Signal of CQI in PUCCH; Agenda Item: 6.1.4 Uplink Control Signal(l)ing; Document for: Discussion and Decision, pp. 01-06.*

R1-073149, (hereinafter R1-073149), 3GPP TSG RAN WG1 Meeting #49bis R1-073149, Orlando, USA, Jun. 25-29, 2007, Agenda Item: 5.13.2, Source: Samsung, Title: Cyclic Shift Hopping of UL ACK Channels; Document for: Discussion/Decision, pp. 01-06.*

3GPP TS 36.212, 3rd Generation Partnership Project; Technical Specification Group Radio Access Network; Multiplexing and channel coding (Release 8), pp. 01-21, dated Jul. 2007.*

3GPP TS 36.211 V9.1.0 (Mar. 2010), Technical Specification, 3rd Generation Partnership Project; Technical Specification Group Radio Access Network; Evolved Universal Terrestrial Radio Access (E-UTRA); Physical Channels and Modulation (Release 9) on Mar. 2010, pp. 01 through 8.*

R1-063128 from 3GPP TSG-RAN WG1 #47, in Riga, Latvia, Nov. 6-10, 2006, Source: Ericsson; Title: Uplink reference signals as part of Agenda Item:6.4.2 and presented as a Document for:Decision.*

3GPP TR 25.814 V7.1.0 (Sep. 2006), (hereinafter 3GPP 25814), Technical Report, 3rd Generation Partnership Project; Technical Specification Group Radio Access Network; Physical layer aspects for evolved Universal Terrestrial Radio Access (UTRA), (Release 7); pp. 01-132.*

R1-081199, (hereinafter R1-081199), 3GPP TSG RAN WG1 Meeting #52bis, R1-81199, Shenzhen, China, Mar. 31-Apr. 4, 2008, Source: Panasonic, NTT DoCoMo; Title: Necessity of the Scrambling for the Reference Signal of CQI in PUCCH; Agenda Item: 6.1.4 Uplink Control Signal(l)ing; Document for: Discussion and Decision, pp. 01-06.*

R1-073149, (hereinafter R1-073149), 3GPP TSG RAN WG1 Meeting #49bis R1-073149, Orlando, USA, Jun. 25-29, 2007, Agenda Item: 5.13.2, Source: Samsung, Title: Cyclic Shift Hopping of UL ACK Channels; Document for: Discussion and Decision, pp. 01-06.*

3GPP TR 25.814 V7.1.0 (Sep. 2006), Technical Report, 3rd Generation Partnership Project; Technical Specification Group Radio Access Network; Physical layer aspects for evolved Universal Terrestrial Radio Access (UTRA), (Release 7); pp. 01-132.*

R1-081199, 3GPP TSG RAN WG1 Meeting #52bis, R1-81199, Shenzhen, China, Mar. 31-Apr. 4, 2008, Source: Panasonic, NTT DoCoMo; Title: Necessity of the Scrambling for the Reference Signal of CQI in PUCCH; Agenda Item: 6.1.4 Uplink Control Signal-(l)ing; Document for: Discussion and Decision, pp. 01-06.*

R1-073149, 3GPP TSG RAN WG1 Meeting #49bis R1-073149, Orlando, USA, Jun. 25-29, 2007, Agenda Item: 5.13.2, Source: Samsung, Title: Cyclic Shift Hopping of UL ACK Channels; Document for: Discussion and Decision, pp. 01-06.*

R1-063128 from 3GPP TSG-RAN WG1 #47, in Riga, Latvia, Nov. 6-10, 2006, Source: Ericsson; Title: Uplink reference signals as part of Agenda Item: 6.4.2 and presented as a Document for: Decision.*

R1-071643 from 3GPP TSG RAN WG1 Meeting #48bis, in St. Julians, Malta, Mar. 26-30, 2007, Source: NTT DoCoMo, Ericsson, Mitsubishi Electric, NEC; Title: Sequence Hopping and Cyclic-Shift Value Hopping for Uplink Reference Signal in E-UTRA as part of Agenda Item: 7.10.2 and presented as a Document for: Discussion and Decision.*

Office Action issued in corresponding Japanese Application No. 2010-225014, mailed Aug. 20, 2013 (7 pages).

NTT Docomo; "Multiplexing Scheme for Sounding RS in E-UTRA Uplink"; 3GPP TSG RAN WG1 Meeting #50bis, R1-074282; Shanghai, China; Oct. 8-12, 2007 (3 pages).

Panasonic, et al., "Necessity of the Scrambling for the Reference Signal of CQI in PUCCH," 3GPP TSG RAN WG1 Meeting #52bis; R1-081199; Shenzhen, China; Mar. 31-Apr. 4, 2008 (6 pages).

Samsung, "UL ACK/NACK channel structure," 3GPP TSG RAN WG1 Meeting #50; R1-073541; Athens, Greece; Aug. 20-24, 2007 (4 pages).

Samsung, "Cyclic Shift Hopping of UL ACK Channels," 3GPP TSG RAN WG1 Meeting #49bis; R1-073149; Orlando, USA; Jun. 25-29, 2007 (6 pages).

CATT, "UL ACK/NACK Transmission Design in FDD with CA," 3GPP TSG RAN WG1 Meeting #60; R1-100876; San Francisco, USA; Feb. 22-26, 2010 (5 pages).

Huawei, "PUCCH design for carrier aggregation," 3GPP TSG RAN WG1 Meeting #57; R1-091810; San Francisco, USA; May 4-8, 2009 (8 pages).

LG Electronics Inc., "Investigation on problems in case of PUCCH and S-RS simultaneous transmission," 3GPP TSG RAN WG1 #49bis; R1-072887; Orlando, FL, USA; Jun. 25-29, 2007 (7 pages).

ZTE, "Multiplexing of Sounding RS and PUCCH," 3GPP TSG-RAN WG1 #50; R1-073589; Athens, Greece; Aug. 20-24, 2007 (6 pages).

KDDI, "Multiplexing of Scheduling Request and ACK/NACK Signals in E-UTRA Uplink," 3GPP TSG RAN WG1 Meeting #52; R1-080972 (Original R1-074761); Sorrento, Italy; Feb. 11-15, 2008 (2 pages).

3GPP TR 25.912 V7.1.0, "3rd Generation Partnership Project; Technical Specification Group Radio Access Network; Feasibility study

(56) References Cited

OTHER PUBLICATIONS for evolved Universal Terrestrial Radio Access (UTRA) and Universal Terrestrial Radio Access Network (UTRAN) (Release 7)," Sep. 2006 (57 pages).

International Search Report issued in PCT/JP2011/060378, mailed on Jun. 21, 2011 (4 pages).
Office Action dated Oct. 28, 2014 in corresponding Japanese Application No. 2013-261995 (with English translation) (7 pages).

* cited by examiner

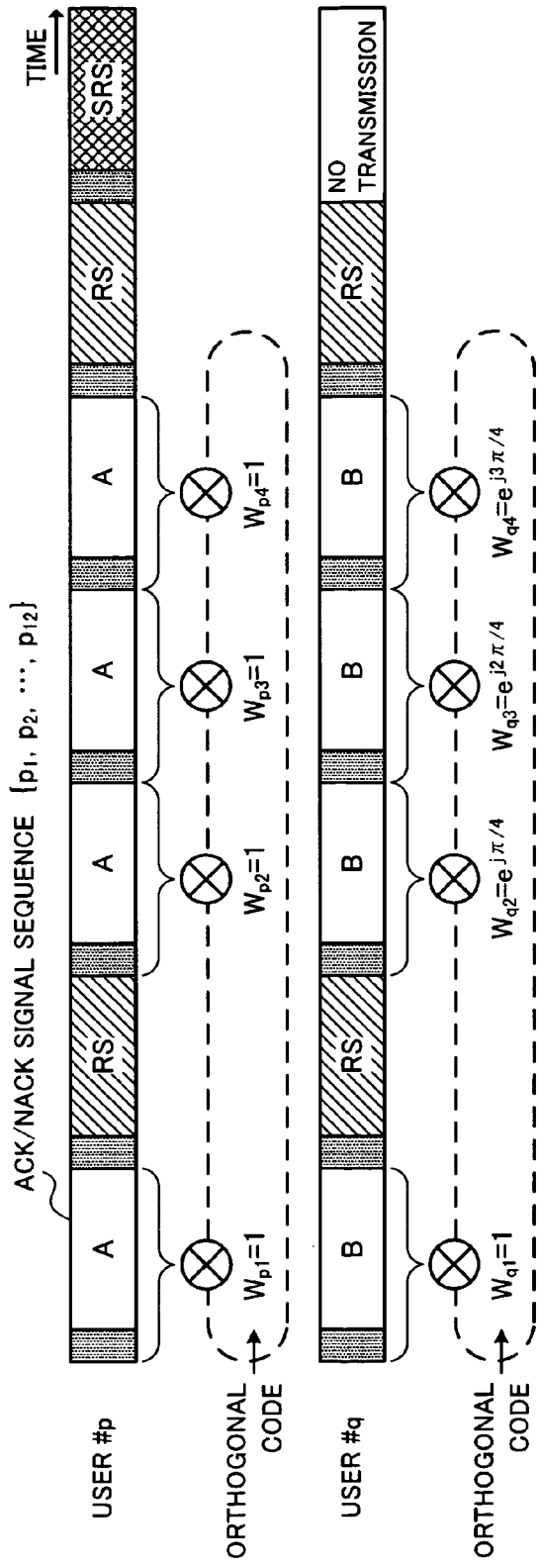
FIG. 9A
FIG. 9B
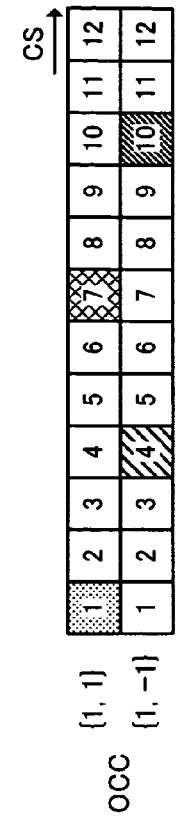
FIG. 9C

MOBILE TERMINAL APPARATUS AND RADIO COMMUNICATION METHOD

TECHNICAL FIELD

The present invention relates to a mobile terminal apparatus and a radio communication method in a next-generation mobile communication system.

BACKGROUND ART

In UMTS (Universal Mobile Telecommunications System) networks, attempts are made to adopt HSDPA (High Speed Downlink Packet Access) or HSUPA (High Speed Uplink Packet Access) for the purpose of improving frequency utilization efficiency and a peak data rate or the like to thereby make the most of features of W-CDMA (Wideband Code Division Multiple Access)-based systems. Regarding this UMTS network, Long Term Evolution (LTE) is being studied aiming at a higher frequency utilization efficiency, improvement of peak data rate and delay reduction or the like (Non-Patent Literature 1). Unlike W-CDMA, LTE uses an OFDMA (Orthogonal Frequency Division Multiple Access)-based scheme for downlinks as a multi-access scheme and uses SC-FDMA (Single Carrier Frequency Division Multiple Access)-based scheme for uplinks.

A signal transmitted over an uplink is mapped to appropriate radio resources and transmitted from a mobile terminal apparatus to a radio base station apparatus as shown in FIG. 1. In this case, user data (UE (User Equipment) #1, UE#2) is allocated to an uplink shared channel (PUSCH: Physical Uplink Shared Channel), and when transmitted simultaneously with user data, control information is time-multiplexed with PUSCH, and when only control information is transmitted, the control information is allocated to an uplink control channel (PUCCH: Physical Uplink Control Channel). The control information transmitted over this uplink contains downlink quality information (CQI: Channel Quality Indicator) and downlink shared channel retransmission response (ACK/NACK) or the like.

PUCCH typically adopts different subframe configurations for when transmitting CQI and ACK/NACK (FIG. 2A, FIG. 2B). In a PUCCH subframe configuration, seven SC-FDMA symbols are included in 1 slot (½ subframe). Furthermore, 1 SC-FDMA symbol includes 12 information symbols (subcarriers). To be more specific, in a CQI subframe configuration (CQI format) as shown in FIG. 2A, reference signals (RSs) are multiplexed with a second symbol (#2) and a sixth symbol (#6) in a slot, and control information (CQI) is multiplexed with other symbols (first symbol, third symbol to fifth symbol, and seventh symbol). Furthermore, in an ACK/NACK subframe configuration (ACK/NACK format) as shown in FIG. 2B, reference signals (RSs) are multiplexed with the third symbol (#3) to fifth symbol (#5) in a slot, and control information (ACK/NACK) is multiplexed with other symbols (first symbol (#1), second symbol (#2), sixth symbol (#6) and seventh symbol (#7)). In 1 subframe, the aforementioned slot is iterated twice. Furthermore, as shown in FIG. 1, PUCCH is multiplexed with radio resources at both ends of the system band and frequency hopping (inter-slot FH) is applied between two slots having different frequency bands within 1 subframe. The PUSCH subframe configuration includes seven SC-FDMA symbols in one slot.

CITATION LIST

Non-Patent Literature

Non-Patent Literature 1: 3GPP, TR25.912 (V7.1.0), "Feasibility study for Evolved UTRA and UTRAN", September 2006

SUMMARY OF INVENTION

Technical Problem

The third-generation system (W-CNIDA) can generally realize a transmission rate of a maximum of the order of 2 Mbps on a downlink using a fixed band of 5 MHz. On the other hand, the LTE system can realize a transmission rate of a maximum of 300 Mbps on a downlink and the order of 75 Mbps on an uplink using a variable band of 1.4 MHz to 20 MHz. Furthermore, as for a UMTS network, studies are also being carried out on a system as the successor to LTE for the purpose of further improvement of frequency utilization efficiency and a peak data rate (e.g., LTE Advanced (LTE-A) system).

Regarding the LTE-A system, studies are being carried out on allocation of wider band frequency than LTE aiming at further improvement of frequency utilization efficiency and peak throughput or the like. Furthermore, it is one requirement for LTE-A to have backward compatibility with LTE and LTE-A adopts a configuration of transmission bands in which a plurality of fundamental frequency blocks (component carriers (CCs)) having bandwidth available to LTE are arranged. For this reason, feedback control information for a data channel transmitted with a plurality of downlink CCs simply increases by a factor of the number of CCs. Thus, since the amount of information of feedback control information increases, the method of transmitting feedback control information through uplink channels needs to be discussed.

The present invention has been implemented in view of the above problems, and it is an object of the present invention to provide a mobile terminal apparatus and a radio communication method capable of efficiently transmitting feedback control information through physical uplink control channels.

Solution to Problem

A mobile terminal apparatus according to the present invention includes a cyclic shift adding section configured to use a plurality of ACK/NACK control bits as data signals and add cyclic shifts to a plurality of reference signal blocks of a plurality of time blocks in a physical uplink control channel format comprised of a plurality of time blocks and an orthogonal code multiplying section configured to multiply the plurality of reference signal blocks by orthogonal codes.

A radio communication method according to the present invention includes the steps of, at a mobile terminal apparatus, using a plurality of ACK/NACK control bits as data signals and adding cyclic shifts to a plurality of reference signal blocks of a plurality of time blocks in a physical uplink control channel format comprised of a plurality of time blocks, multiplying the plurality of reference signal blocks by orthogonal codes, and transmitting a control channel signal including reference signals multiplied by orthogonal codes to a radio base station apparatus through a physical uplink control channel.

Advantageous Effects of Invention

According to the present invention, a plurality of ACK/NACK control bits are used as data signals, cyclic shifts are added to a plurality of reference signal blocks of a plurality of time blocks in a physical uplink control channel format comprised of a plurality of time blocks, the plurality of reference signal blocks are multiplied by orthogonal codes, a control channel signal including the reference signals multiplied by the orthogonal codes are transmitted to a radio base station apparatus through a physical uplink control channel, and it is thereby possible to efficiently transmit feedback control information through the physical uplink control channel.

BRIEF DESCRIPTION OF DRAWINGS

FIG. 9 is a diagram illustrating orthogonal multiplexing by block spreading in a mobile terminal apparatus according to Embodiment 3 of the present invention;

DESCRIPTION OF EMBODIMENTS

Hereinafter, embodiments of the present invention will be described in detail with reference to the accompanying drawings.

Here, a physical uplink control channel (PUCCH) format using orthogonal multiplexing will be described. When uplink control channel signals of a plurality of users are multiplexed in a PUCCH, a radio base station apparatus orthogonally multiplexes the uplink control channel signals so that the uplink control channel signals can be demultiplexed for each user. Examples of such an orthogonal multiplexing method include an orthogonal multiplexing method using cyclic shifts of a CAZAC (Constant Amplitude Zero Auto Correlation) code sequence and an orthogonal multiplexing method using block spreading. The PUCCH format is made up of a plurality of time blocks using a plurality of ACK/NACK control bits as data signals.

Figure 3A:
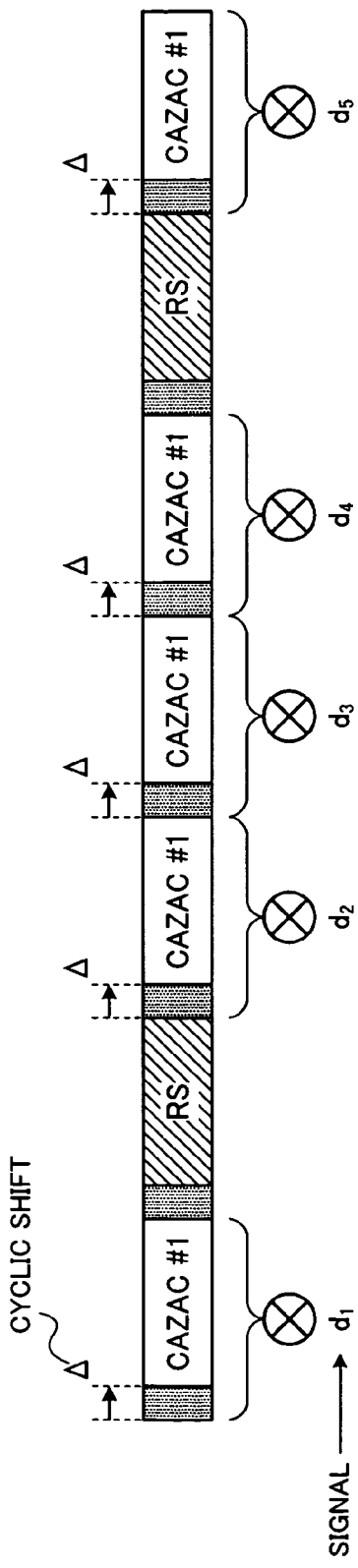
FIG. 3A is a diagram illustrating orthogonal multiplexing by cyclic shift using a CAZAC code sequence and FIG. 3B is a diagram illustrating orthogonal multiplexing by block spreading.

The orthogonal multiplexing method using cyclic shifts of a CAZAC code sequence is an orthogonal multiplexing method taking advantage of the fact that a sequence CAZAC#1 ($\Delta p$) resulting from cyclic-shifting a CAZAC code sequence having a code length of L by $\Delta p$ and a sequence CAZAC#1 ($\Delta q$) resulting from cyclic-shifting the CAZAC code sequence by $\Delta q$ are orthogonal to each other. Therefore, this method modulates (block modulation) one entire SC-FDMA symbol using control information for an SC-FDMA symbol to which a CAZAC code sequence with the changed amount of cyclic shift is mapped and thereby orthogonally multiplexes uplink control channel signals for each user. For example, as shown in FIG. 3A, in an ACK/NACK subframe configuration (format 2/2a/2b), a CAZAC code sequence having a specific amount of cyclic shift ($\Delta$) is mapped to each SC-FDMA symbol. Block modulation is then performed using uplink control signals $d_1$ to $d_5$ after the data modulation. It is possible to realize orthogonality among uplink control channel signals the respective users by assigning amounts of cyclic shift differing from one user to another to respective users. This allows the radio base station apparatus to demultiplex uplink control channel signals for the respective users. The interval of cyclic shift of the CAZAC code sequence assigned to the users is preferably set to be longer than the maximum amount of delay of multipath.

Figure 3B:
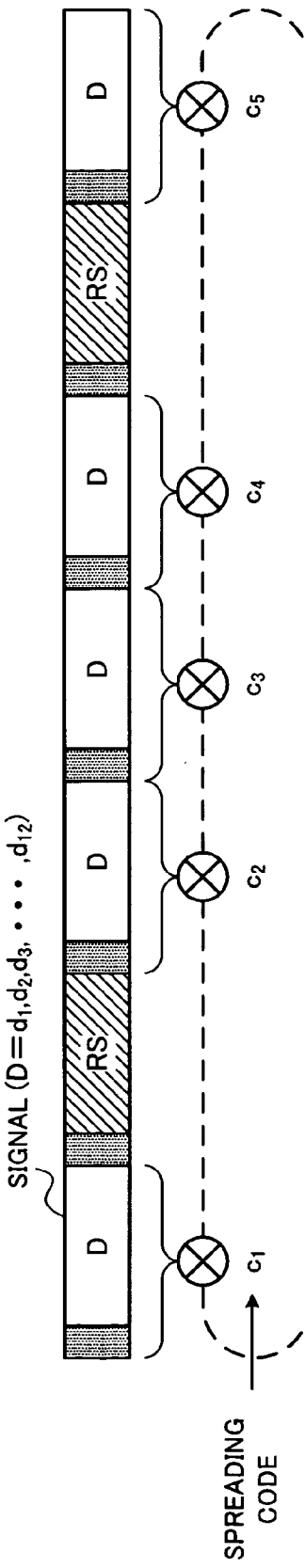

Block spreading is an orthogonal multiplexing method which applies an orthogonal code in the time direction. For example, as shown in FIG. 3B, signal A in 1 SC-FDMA is duplicated and mapped to five SC-FDMA symbols (first symbol, third symbol to fifth symbol, and seventh symbol). Furthermore, all SC-FDMA symbols (first symbol, third symbol to fifth symbol, and seventh symbol) are multiplied by spreading codes $c_1$ to $c_5$. Using spreading codes orthogonal among different users, it is possible to realize orthogonality among uplink control channel signals for the respective users, and the radio base station apparatus can demultiplex the uplink control channel signals for the respective users.

The present inventor et al. came up with the present invention by noticing the PUCCH format used in the orthogonal multiplexing method in FIG. 3A and FIG. 3B, and discovering that when orthogonalizing two RS symbols in a slot among users, it is possible to efficiently transmit feedback control information (ACK/NACK) through a PUCCH by combining cyclic shift and orthogonal code (OCC: Orthogonal Cover Code) multiplication.

That is, an essence of the present invention is using a plurality of ACK/NACK control bits as data signals in a mobile terminal apparatus, adding cyclic shifts (CS) to a plurality of reference signal blocks of a plurality of time blocks in a PUCCH format comprised of a plurality of time blocks, multiplying the plurality of reference signal blocks by orthogonal codes, and transmitting a control channel signal including reference signals multiplied by orthogonal codes to a radio base station apparatus through a physical uplink control channel to thereby efficiently transmit feedback control information through the PUCCH.

Figure 1:
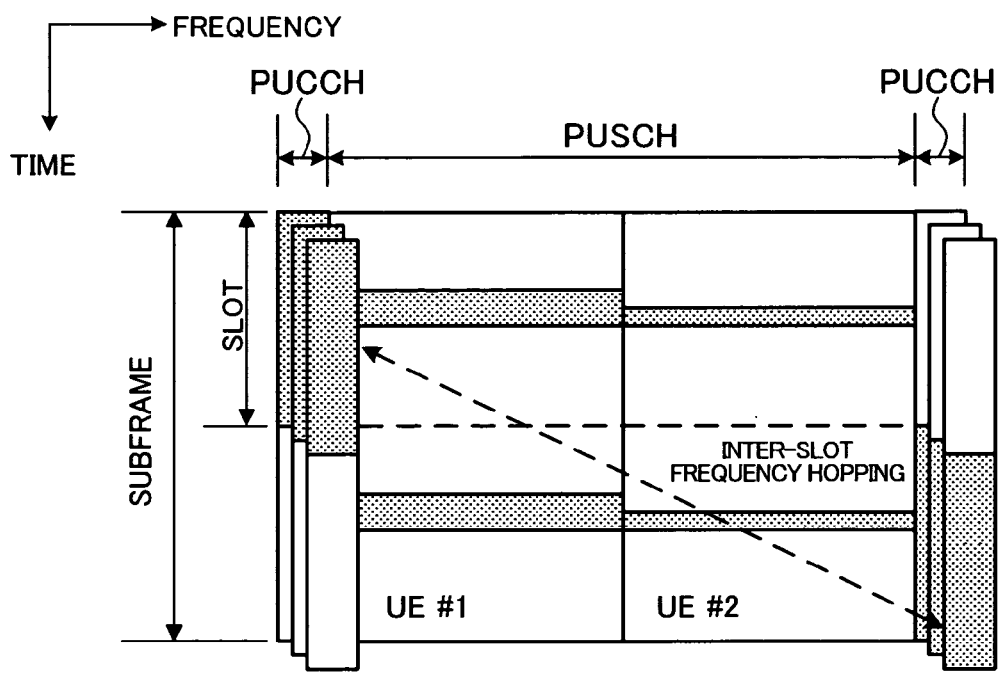
FIG. 1 is a diagram illustrating a channel configuration in which an uplink signal is mapped.
Figure 2A:
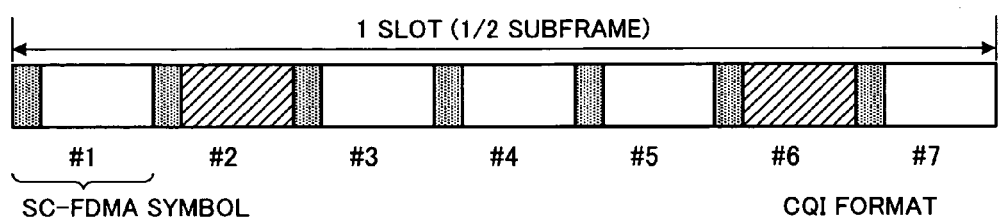
FIG. 2A and FIG. 2B are diagrams illustrating a physical uplink control channel format.
Figure 2B:
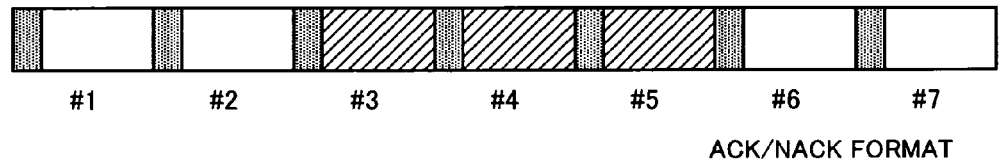

Here, OCCs (two codes of {1,1} and {1,−1}) are applied taking advantage of the fact that there are two RS symbols in a slot (time blocks #2 and #6 (reference signal blocks) in FIG. 2A). Thus, by applying CS and OCC to RS symbols in the ACK/NACK PUCCH format, it is possible to improve the accuracy of orthogonalization of RS symbols.

Figure 4A:
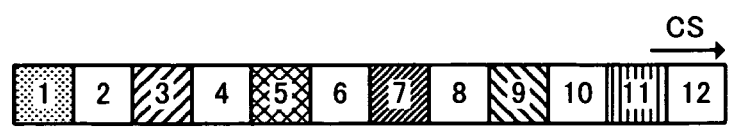
FIG. 4A is a diagram illustrating cyclic shift resources used for data signals in Embodiment 1 of the present invention and FIG. 4B is a diagram illustrating cyclic shift and orthogonal code resources used for reference signals in Embodiment 1 of the present invention.
Figure 4B:
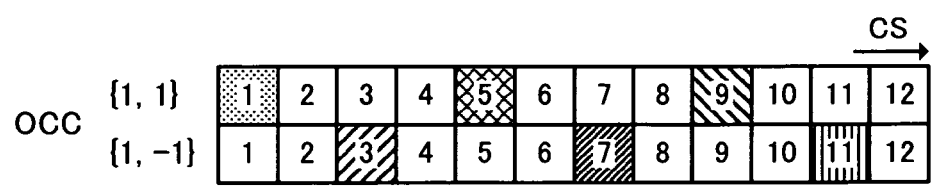

The orthogonal multiplexing method using cyclic shifts applies only CS-based orthogonal multiplexing to data signals (data symbols) (only cyclic shifts are added to time blocks that transmit data signals) as shown in FIG. 4A and applies orthogonal multiplexing using CS and OCC concurrently to reference signals (RS symbols) as shown in FIG. 4B. In FIG. 4A and FIG. 4B, the difference in shading represents the difference between users. Regarding data symbols, 12 resources are used, and therefore, six users are multiplexed every other CS as shown, for example, in FIG. 4A. On the other hand, regarding RS symbols, 12 CS resources×2 OCC resources are used, and therefore six users can be multiplexed every three CSs as shown, for example, in FIG. 4B. Using CS and OCC concurrently for RS symbols makes it possible to provide a greater maximum allowable amount of multipath delay and improve the accuracy of orthogonalization of RS symbols. As a result, it is possible to improve the accuracy of channel estimation used for demodulation.

In the orthogonal multiplexing method using cyclic shifts, information as to which OCC should be used for RS symbols may be reported from a higher layer through RRC signaling (explicit signaling) or may be associated with CS of data symbols beforehand (implicit signaling) and OCC may be determined based on the CS of the data symbols. That is, cyclic shift added to data symbols may be associated with cyclic shifts added to RS symbols and orthogonal codes multiplied.

Figure 5A:
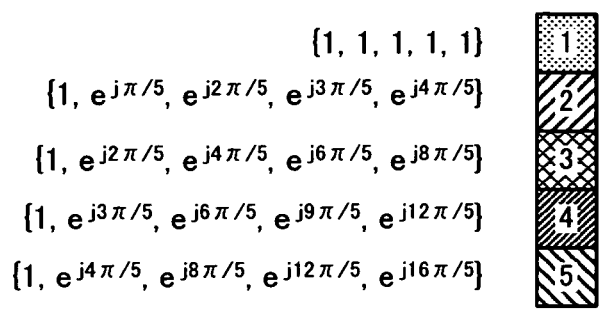
FIG. 5A is a diagram illustrating cyclic shift resources used for data signals in Embodiment 2 of the present invention.
Figure 5B:
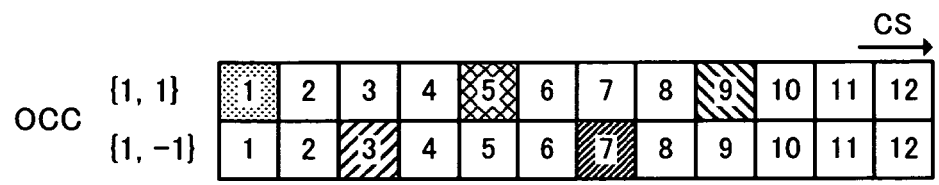
FIG. 5B and FIG. 5C are diagrams illustrating cyclic shift and orthogonal code resources used for reference signals in Embodiment 2 of the present invention.

In the orthogonal multiplexing method using block spreading, only OCC-based orthogonal multiplexing is applied to data signals (data symbols) (a plurality of time blocks that transmit data signals are multiplied by orthogonal codes) as shown in FIG. 5A, whereas orthogonal multiplexing using CS and OCC concurrently is applied to reference signals (RS symbols) as shown in FIG. 5B. In FIG. 5A and FIG. 5B, the difference in shading represents the difference between users. Regarding data symbols, five users are multiplexed using OCC. On the other band, since 12 CS resources×2 OCC resources are used for RS symbols, five users are multiplexed as shown, for example, in FIG. 5B. By using CS and OCC concurrently for RS symbols, it is possible to improve the accuracy of orthogonalization of RS symbols. As a result, it is possible to improve the accuracy of channel estimation used for demodulation.

In the orthogonal multiplexing method using block spreading, information as to which CS and OCC should be used for RS symbols may be preferably associated with block spreading codes of data symbols beforehand (implicit signaling), and then CS and OCC may be determined based on the block spreading codes of data symbols. That is, orthogonal codes by which data symbols are multiplied may be associated with cyclic shifts added to RS symbols and orthogonal codes multiplied.

Data signals in the PUCCH format may include ACK/NACK control information in accordance with the number of data pieces multiplexed that can be received over a downlink. In this case, when the number of data pieces multiplexed is smaller than a predetermined number, information indicating that a control channel signal cannot be received over a downlink may be included in the data signals.

Rel.8 LTE defines a report (1 bit) of a scheduling request for a CQI PUCCH format (1/1a/1b) but defines no report of a scheduling request for an ACK/NACK PUCCH format (2/2a/2b). The present invention can report a scheduling request using OCC codes {1,1} and {1,−1}. That is, it is possible to report control information (scheduling request) other than ACK/NACK using orthogonal codes. For example, when a mobile terminal apparatus requests scheduling from a radio base station apparatus, code {1,1} is changed to code {1,−1} for OCC and transmitted. That is, an orthogonal code (OCC code) by which a data signal is multiplied may be associated with a report of a scheduling request.

Figure 5C:
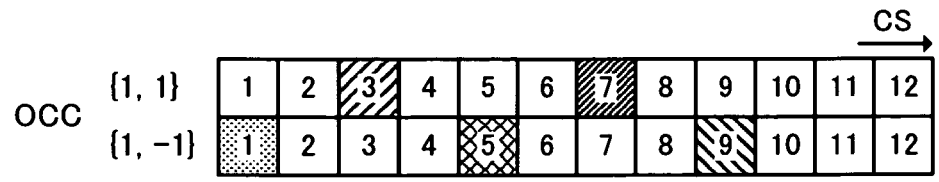

Alternatively, when there is no scheduling request, the cyclic shift and orthogonal code resource allocation pattern shown in FIG. 5B may be used, and when there is a scheduling request, the cyclic shift and orthogonal code resource allocation pattern shown in FIG. 5C may be used. As described above, instead of inverting the OCC code and reporting a scheduling request, the cyclic shift and orthogonal code resource allocation pattern may be changed based on the presence/absence of a scheduling request to report a scheduling request. Thus, by reporting scheduling request information using the orthogonal code or orthogonal code resource allocation pattern, it is possible to report a scheduling request even in the PUCCH format (2/2a/2b).

As described above, the LTE-A system adopts a configuration of transmission bands in which a plurality of fundamental frequency blocks (component carriers: CCs) having a bandwidth available to LTE are arranged. The component carrier CCs include primary component carriers (hereinafter referred to as "PCCs") and secondary component carriers (hereinafter referred to as "SCCs"). A PCC is a frequency band available to both the existing communication scheme such as an LTE scheme and next-generation communication scheme such as an LTE-A scheme. On the other hand, an SCC is a frequency band available to a next-generation communication scheme such as an LTE-A scheme. With such a CC configuration, a mobile terminal apparatus supporting the next-generation communication scheme can perform fast/large-volume communication using a PCC and one or more SCCs. That is, by allocating one PCC and one or a plurality of SCCs to the mobile terminal apparatus on a downlink, it is possible to realize a wider bandwidth (carrier aggregation). On the other hand, a mobile terminal apparatus not supporting the next-generation communication scheme can communicate using PCCs, and backward compatibility to mobile terminal apparatuses not supporting the next-generation communication scheme is thus secured.

In this case, if the radio base station apparatus can know whether or not the mobile terminal apparatus has received a PCC control channel signal, the radio base station apparatus can perform high accuracy link adaptation (transmission power control or the like) of a control channel or retransmission control or the like. For this reason, the present invent ion may also report information indicating whether or not a PCC control channel signal has been received by including it in ACK/NACK control information.

In this case, 1 bit may be added to the ACK/NACK control information, reception information indicating whether or not a PCC control channel signal has been received may be included in the ACK/NACK control information and this reception information may be reported to the radio base station apparatus. Alternatively, the reception information may be reported to the radio base station apparatus using OCC codes {1,1} and {1,−1}. That is, an orthogonal code may be used to report control information other than ACK/NACK (reception information indicating whether or not the PCC control channel signal has been received). For example, when the mobile terminal apparatus reports reception information indicating whether or not the PCC control channel signal has been received to the radio base station apparatus, the mobile terminal apparatus changes code {1,1} to code {1,−1} for OCC and transmits it. That is, an orthogonal code (OCC code) by which a data signal is multiplied may be associated with the reception information indicating whether or not the PCC control channel signal has been received.

By including the reception information indicating whether or not the PCC control channel signal has been received in the ACK/NACK control information and reporting this reception information to the radio base station apparatus in this way, the radio base station apparatus can thereby know whether or not the control channel signal transmitted from a PCC has normally been transmitted. For this reason, it is possible to perform high accuracy control channel link adaptation (transmission power control or the like) and retransmission control or the like using the reception information.

Embodiment 1

The present embodiment will describe a case where when signal transmission is performed through a PUCCH, signals from a plurality of users are identified using cyclic shifts of a CAZAC code sequence and ACK/NACK signals which are feedback control information are transmitted.

Figure 6:
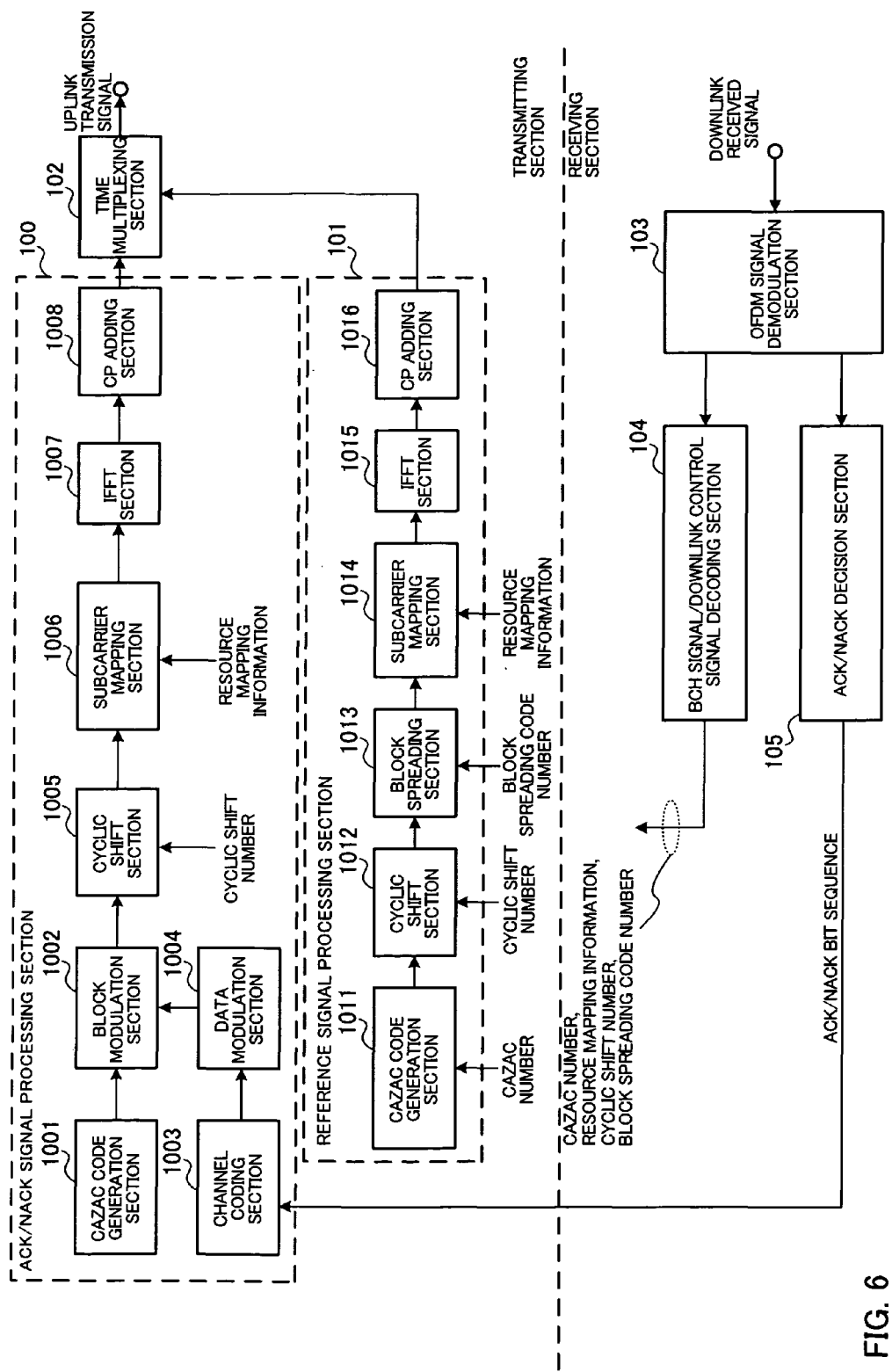
FIG. 6 is a diagram illustrating a schematic configuration of a mobile terminal apparatus according to Embodiment 1 of the present invention.

FIG. 6 is a diagram illustrating a schematic configuration of a mobile terminal apparatus according to Embodiment 1 of the present invention. The mobile terminal apparatus shown in FIG. 6 is provided with a transmitting section and a receiving section. The transmitting section is provided with an ACK/NACK signal processing section 100, a reference signal processing section 101 and a time multiplexing section 102 that time-multiplexes ACK/NACK signals and reference signals.

The ACK/NACK signal processing section 100 includes a CAZAC code generation section 1001 that generates a CAZAC code sequence corresponding to a CAZAC number, a channel coding section 1003 that performs error correcting coding on an ACK/NACK bit sequence, a data modulation section 1004 that performs data modulation, a block modulation section 1002 that performs block modulation on the generated CAZAC code sequence using the signal after the data modulation, a cyclic shift section 1005 that performs cyclic shift on the signal after the block modulation, a subcarrier mapping section 1006 that maps the signal after the cyclic shift to subcarriers, an IFFT section 1007 that performs inverse fast Fourier transform (IFFT) on the mapped signal and a CP adding section 1008 that adds a CP (Cyclic Prefix) to the signal after the IFFT.

The reference signal processing section 101 includes a CAZAC code generation section 1011 that generates a CAZAC code sequence corresponding to a CAZAC number, a cyclic shift section 1012 that performs cyclic shifts on reference signals made up of the CAZAC code sequence, a block spreading section 1013 that performs block spreading on the signal after the cyclic shift (multiplied by an orthogonal code), a subcarrier mapping section 1014 that maps the signal after the block spreading to subcarriers, an IFFT section 1015 that performs IFFY on the mapped signal and a CP adding section 1016 that adds a CP to the signal after the IFFT.

The mobile terminal apparatus decides ACK/NACK using a downlink signal and generates an ACK/NACK bit sequence corresponding thereto. The data modulation section 1004 of the ACK/NACK signal processing section 100 modulates the ACK/NACK bit sequence channel-coded in the channel coding section 1003 into a polar coordinate component signal. The data modulation section 1004 outputs the data-modulated signal to the block modulation section 1002. The CAZAC code generation section 1001 prepares a CAZAC code sequence corresponding to a CAZAC number assigned to a user. The CAZAC code generation section 1001 outputs the CAZAC code sequence generated to the block modulation section 1002. The block modulation section 1002 block-modulates the CAZAC code sequence with the data-modulated control signal for every block unit corresponding to 1 SC-FDMA. The block modulation section 1002 outputs the block-modulated signal to the cyclic shift section 1005.

The cyclic shift section 1005 cyclic-shifts a time-domain signal by a predetermined amount of cyclic shift. The amount of cyclic shift differs from one user to another and is associated with a cyclic shift number. The cyclic shift section 1005 outputs the cyclic-shifted signal to the subcarrier mapping section 1006. The subcarrier mapping section 1006 maps the cyclic-shifted signal to subcarriers based on resource mapping information. The subcarrier mapping sect ion 1006 outputs the mapped signal to the IFFT section 1007.

The IFFT section 1007 applies IFFT to the mapped signal to transform it into a time-domain signal. The IFFT section 1007 outputs the signal after the IFFT to the CP adding section 1008. The CP adding section 1008 adds a CP to the mapped signal. The CP adding section 1008 outputs the signal with the CP to the time multiplexing section 102.

The CAZAC code generation section 1011 of the reference signal processing section 101 prepares a CAZAC code sequence corresponding to the CAZAC number assigned to the user and uses it as a reference signal. The CAZAC code generation section 1011 outputs the reference signal to the cyclic shift section 1012.

The cyclic shift section 1012 shifts the time-domain reference signal by a predetermined amount of cyclic shift. The amount of cyclic shift differs from one user to another and is associated with a cyclic shift number. The cyclic shift section 1012 outputs the cyclic-shifted reference signal to the block spreading section 1013. The block spreading section (orthogonal code multiplying section) 1013 multiplies the cyclic-shifted reference signal by orthogonal codes (OCC) ($\{1,1\}$, $\{1,-1\}$) (block spreading). Here, the OCC (block spreading code number) used for the reference signal may be reported from a higher layer through RRC signaling or the like or an OCC associated with the CS of the data symbol beforehand may be used. The block spreading section 1013 outputs the block-spread signal to the subcarrier mapping section 1014.

The subcarrier mapping section 1014 maps the frequency-domain signal to subcarriers based on resource mapping information. The subcarrier mapping section 1014 outputs the mapped reference signal to the IFFT section 1015. The IFFT section 1015 applies IFFT to the mapped signal to transform it into a time-domain reference signal. The IFFT section 1015 outputs the reference signal after the IFFT to the CP adding section 1016. The CP adding section 1016 adds a CP to the reference signal multiplied by an orthogonal code. The CP adding section 1016 outputs the reference signal with the CP to the time multiplexing section 102.

The time multiplexing section 102 time-multiplexes the signal from the ACK/NACK signal processing section 100 with the reference signal from the reference signal processing section 101 to generate a transmission signal including an uplink control channel signal.

The receiving section includes an OFDM signal demodulation section 103 that demodulates an OFDM signal, a BCH signal/downlink control signal decoding section 104 that decodes a BCH (Broadcast Channel) signal and a downlink control signal and an ACK/NACK decision section 105 that decides ACK/NACK through a downlink signal.

The OFDM signal demodulation section 103 receives and demodulates a downlink OFDM signal. That is, the OFDM signal demodulation section 103 removes a CP from the downlink OFDM signal, applies fast Fourier transform thereto, extracts subcarriers to which a BCH signal or a downlink control signal is allocated and performs data demodulation. The OFDM signal demodulation section 103 outputs the data-demodulated signal to the BCH signal/downlink control signal decoding section 104. Furthermore, the OFDM signal demodulation section 103 outputs the downlink signal to the ACK/NACK decision section 105.

The BCH signal/downlink control signal decoding section 104 decodes the data-demodulated signal to obtain a CAZAC number, resource mapping information (including the resource block number), cyclic shift number and block spreading code number. The BCH signal/downlink control signal decoding section 104 outputs the CAZAC number to the CAZAC code generation sections 1001 and 1011, outputs the resource mapping information to the subcarrier mapping sections 1006 and 1014, outputs the cyclic shift number to the cyclic shift sections 1005 and 1012 and outputs the block spreading code number (OCC number) to the block spreading section 1014.

The ACK/NACK decision section 105 decides whether or not the received downlink shared data channel signal (PDSCH signal) has been received without error and outputs the decision result. The decision result is expressed by delivery confirmation information representing an affirmative response (ACK bit) or negative response (NACK bit). The ACK/NACK decision section 105 outputs the ACK/NACK bit sequence to the channel coding section 1003.

Figure 7:
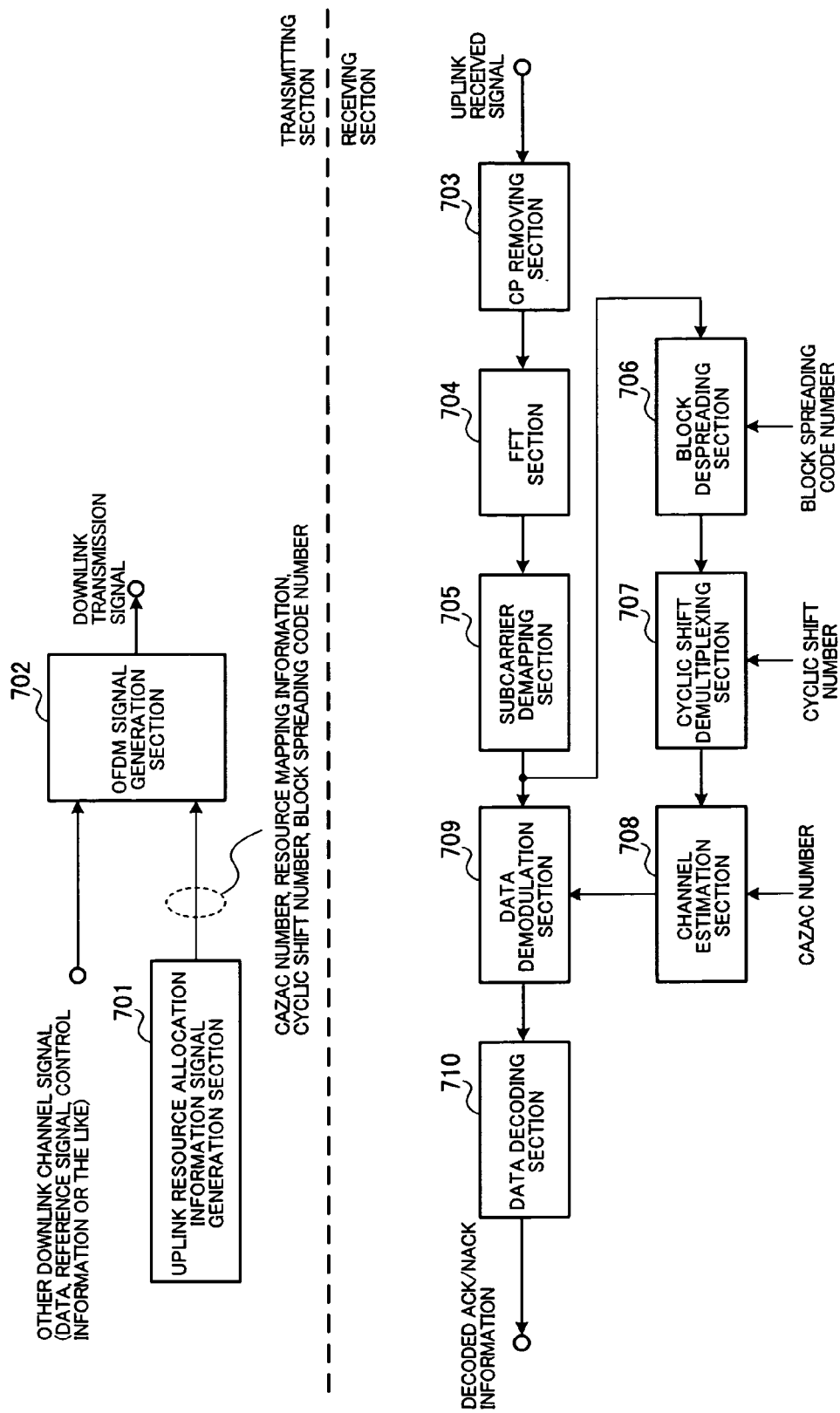
FIG. 7 is a diagram illustrating a schematic configuration of a radio base station apparatus according to Embodiments 1 and 2 of the present invention.

FIG. 7 is a diagram illustrating a schematic configuration of the radio base station apparatus according to Embodiment 1 of the present invention. The radio base station apparatus shown in FIG. 7 is provided with a transmitting section and a receiving section. The transmitting section includes an uplink resource allocation information generation section 701, and an OFDM signal generation section 702 that multiplexes another downlink channel signal with the uplink resource allocation information signal to generate an OFDM signal. The other downlink channel signal includes data, reference signal, control signal or the like, and the uplink resource allocation information signal includes a CAZAC number, resource mapping information, cyclic shift number, block spreading code number (OCC number) or the like.

The CAZAC number, resource mapping information, cyclic shift number, block spreading code number (OCC number) may be transmitted to the mobile terminal apparatus through a BCH or may be transmitted to the mobile terminal apparatus through a downlink control channel (PDCCH: Physical Downlink Control Channel). Alternatively, the CAZAC number, resource mapping information, cyclic shift number or block spreading code number (OCC number) may be reported to the mobile terminal apparatus in a higher layer.

The OFDM signal generation section 702 maps a downlink signal including the other downlink channel signal and uplink resource allocation information signal to subcarriers, applies inverse fast Fourier transform (IFFT), and adds a CP to thereby generate a downlink transmission signal.

The receiving section includes a CP removing section 703 that removes a CP from a received signal, an FFT section 704 that applies fast Fourier transform (FFT) to the received signal, a subcarrier demapping section 705 that demaps the signal after the FFT, a block despreading section 706 that despreads the subcarrier demapped signal with a block spreading code (OCC), a cyclic shift demultiplexing section 707 that removes the cyclic shift from the despread signal and demultiplexes a signal of a target user, a channel estimation section 708 that performs channel estimation on the demultiplexed demapped signal, a data demodulation section 709 that data-demodulates the subcarrier demapped signal using the channel estimate value and a data decoding section 710 that data-decodes the signal after the data demodulation.

The CP removing section 703 removes the portion corresponding to the CP and extracts a valid signal portion. The CP removing section 703 outputs the signal after the CP removal to the FFT section 704. The FFT section 704 applies FFT to the received signal to transform it into a frequency-domain signal. The FFT section 704 outputs the signal after the FFT to the subcarrier demapping section 705.

The subcarrier demapping section 705 extracts an ACK/NACK signal which is an uplink control channel signal from the frequency-domain signal using resource mapping information. The subcarrier demapping section 705 outputs the extracted ACK/NACK signal to the data demodulation section 709. The subcarrier demapping section 705 outputs the extracted ACK/NACK signal to the block despreading section 706.

The block despreading section 706 despreads the received signal subjected to block spreading, that is, orthogonally multiplexed using orthogonal codes (OCCs) (block spreading codes), using orthogonal codes ($\{1,1\}$, $\{1,-1\}$) used in the mobile terminal apparatus. The block despreading section 706 outputs the despread signal to the cyclic shift demultiplexing section 707.

The cyclic shift demultiplexing section 707 demultiplexes the control signal orthogonally multiplexed using cyclic shift using the cyclic shift number. An uplink control channel signal from the mobile terminal apparatus is subjected to cyclic shift by amounts of cyclic shift differing from one user to another. Therefore, by performing cyclic shift in the reverse direction by the same amount of cyclic shift as that performed in the mobile terminal apparatus, it is possible to demultiplex control signals of the user as the target of the reception processing. The cyclic shift demultiplexing section 707 outputs the signal after the user demultiplexing to the channel estimation section 708.

The channel estimation section 708 demultiplexes the reference signals orthogonally multiplexed using the cyclic shifts and orthogonal codes using cyclic shift numbers and OCC numbers as required. The channel estimation section 708 performs cyclic shift in the reverse direction using an amount of cyclic shift corresponding to the cyclic shift number. Furthermore, the channel estimation section 708 performs despreading using orthogonal codes corresponding to the OCC numbers. This allows the users' signals (reference signals) to be demultiplexed. Furthermore, the channel estimation section 708 extracts the reference signals received from the frequency-domain signal using resource mapping information. The channel estimation section 708 obtains a correlation between the CAZAC code sequence corresponding to the CAZAC number and the received CAZAC code sequence to thereby perform channel estimation.

The data demodulation section 709 data-demodulates the ACK/NACK signals and outputs the ACK/NACK signals to the data decoding section 710. In this case, the data demodulation section 709 performs data demodulation based on the channel estimate value from the channel estimation section 708. Furthermore, the data decoding section 710 data-decodes the demodulated ACK/NACK signals and outputs the decoded ACK/NACK signals as ACK/NACK information.

The mobile terminal apparatus in the above-described configuration adds a cyclic shift to a reference signal in the ACK/NACK PUCCH format and multiplies the reference signal by an orthogonal code. This causes the reference signal to be user-multiplexed as shown in FIG. 4B. The mobile terminal apparatus transmits the control channel signal with the cyclic shift added and including the reference signal multiplied by the orthogonal code to the radio base station apparatus through a PUCCH. By performing user orthogonalization using CS and OCC concurrently in this way, it is possible to improve the accuracy of orthogonalization and efficiently transmit ACK/NACK information through a PUCCH.

Embodiment 2

The present embodiment will describe a case where when transmission is performed through a PUCCH, signals from a plurality of users are identified using block spreading and ACK/NACK signals which are feedback control information are transmitted.

Figure 8:
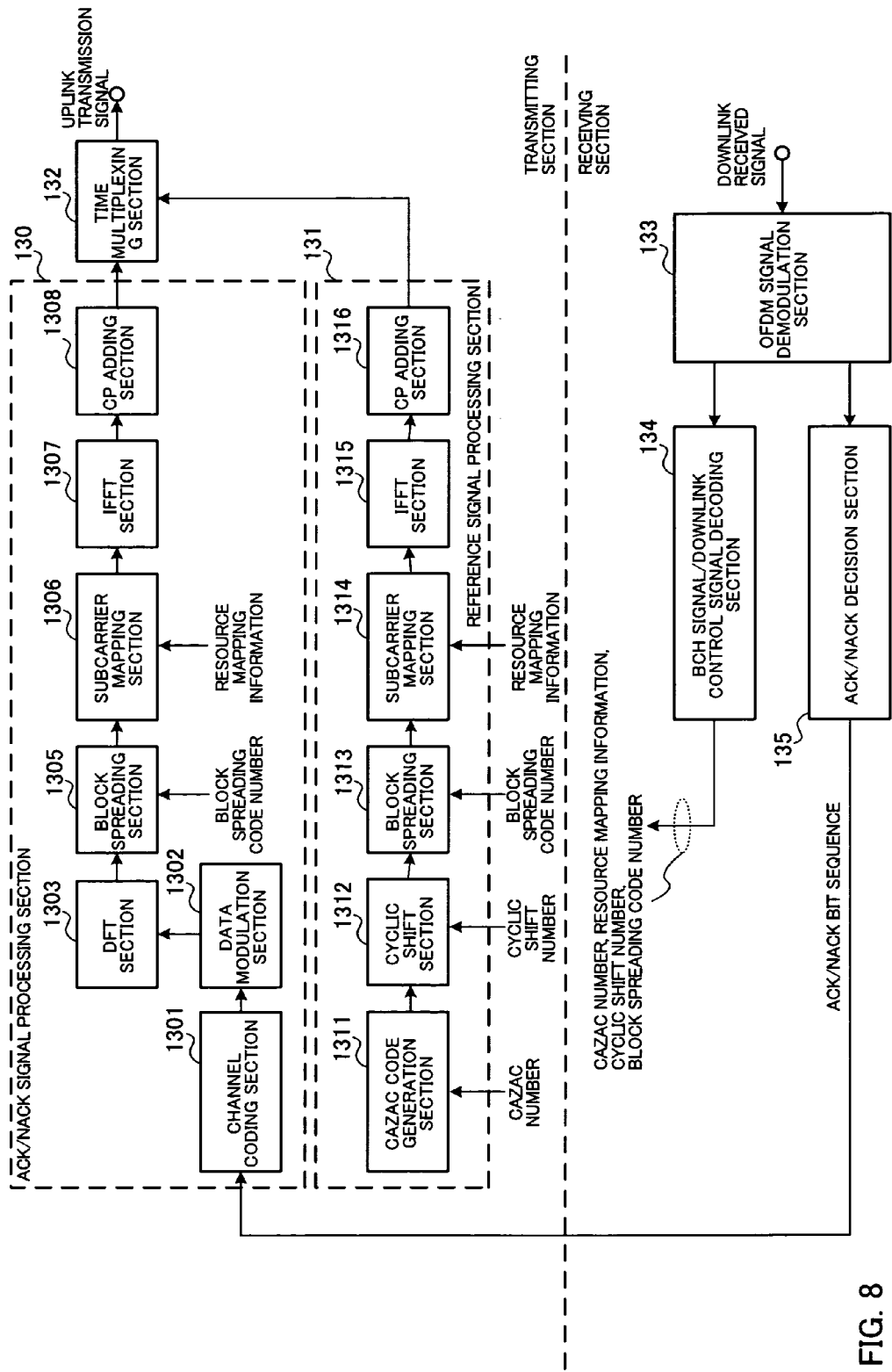
FIG. 8 is a diagram illustrating a schematic configuration of a mobile terminal apparatus according to Embodiment 2 of the present invention.

FIG. 8 is a diagram illustrating a schematic configuration of a mobile terminal apparatus according to Embodiment 2 of the present invention. The mobile terminal apparatus shown in FIG. 8 is provided with a transmitting section and a receiving section. The transmitting section is provided with an ACK/NACK signal processing section 130, a reference signal processing section 131, and a time multiplexing section 132 that time-multiplexes ACK/NACK signals and reference signals.

The ACK/NACK signal processing section 130 includes a channel coding section 1301 that performs error correcting coding on an ACK/NACK bit sequence, a data modulation section 1302 that data-modulates the ACK/NACK bit sequence, a DFT section 1303 that applies DFT (Discrete Fourier Transform) to the data-modulated signal, a block spreading section 1305 that block-spreads the signal after the DFT with a block spreading code, a subcarrier mapping section 1306 that maps the block-spread signal to subcarriers, an IFFT section 1307 that applies IFFY to the mapped signal, a CP adding section 1308 that adds a CP to the signal after the IFFT. Since the data modulation section 1302, subcarrier mapping section 1306, IFFT section 1307 and CP adding section 1308 are identical to the data modulation section 1014, subcarrier mapping section 1006, IFFT section 1007 and CP adding section 1008 in Embodiment 1 respectively, detailed descriptions thereof will be omitted.

The reference signal processing section 131 includes a CAZAC code generation section 1311 that generates a CAZAC code sequence corresponding to a CAZAC number, a cyclic shift section 1312 that cyclic-shifts reference signals made up of the CAZAC code sequence, a block spreading section 1313 that block-spreads the cyclic-shifted signal using a block spreading code, a subcarrier mapping section 1314 that maps the block-spread signal to subcarriers, an IFFT section 1315 that applies IFFT to the mapped signal, and a CP adding-section 1316 that adds a CP to the signal after the IFFT. The CAZAC code generation section 1311, cyclic shift section 1312, block spreading section 1313, subcarrier mapping section 1314, IFFT section 1315 and CP adding section 1316 are identical to the CAZAC code generation section 1011, cyclic shift section 1012, block spreading section 1013, subcarrier mapping section 1014, IFFY section 1015 and CP adding section 1016 in Embodiment 1 respectively, and therefore detailed descriptions thereof will be omitted.

The block spreading sections 1305 and 1313 multiply a time-domain signal by a block spreading code. The block spreading code differs from one user to another and is associated with the spreading code number. Furthermore, the block spreading section 1313 multiplies a cyclic-shifted reference signal by a block spreading code (orthogonal codes (OCCs) ({1,1}, {1,−1})). Here, for OCC used for a reference signal, it is preferable to use OCC associated with a block spreading code of a data symbol beforehand. The block spreading sections 1305 and 1313 output the block-spread signal to the subcarrier mapping sections 1306 and 1314 respectively.

The receiving section includes an OFDM signal demodulation section 133 that demodulates an OFDM signal, a BCH signal/downlink control signal decoding section 134 that decodes a BCH signal/downlink control signal and an ACK/NACK decision section 135 that decides whether or not a downlink shared data channel signal (PDSCH (Physical Downlink Shared Channel)) has been received without errors. Since the OFDM signal demodulation section 133 and the BCH signal/downlink control signal decoding section 134 are identical to the OFDM signal demodulation section 103 and the BCH signal/downlink control signal decoding section 104 in Embodiment 1 respectively, descriptions thereof will be omitted.

The ACK/NACK decision section 135 decides whether or not the received downlink shared data channel signal (PDSCH signal) has been received without errors and outputs the decision result. The decision result is expressed by delivery confirmation information representing an affirmative response (ACK bit) or negative response (NACK bit). The ACK/NACK decision section 135 outputs the ACK/NACK bit to the channel coding section 1301.

The BCH signal/downlink control signal decoding section 134 decodes the data-demodulated signal to obtain a CAZAC number, resource mapping information (including the resource block number), cyclic shift number and block spreading code number. The BCH signal/downlink control signal decoding section 134 outputs the CAZAC number to the CAZAC code generation section 1311, outputs the resource mapping information to the subcarrier mapping sections 1306 and 1314, outputs the cyclic shift number to the cyclic shift section 1312 and outputs the block spreading code number to the block spreading sections 1305 and 1314.

Since the radio base station apparatus according to Embodiment 2 of the present invention is identical to the radio base station apparatus according to Embodiment 1 (FIG. 7), descriptions thereof will be omitted.

The mobile terminal apparatus in the above-described configuration adds cyclic shifts to reference signals in an ACK/NACK PUCCH format and multiplies the reference signals by orthogonal codes. This causes the reference signals to be user-multiplexed as shown in FIG. 5B. The mobile terminal apparatus transmits a control channel signal with such a cyclic shift added and including reference signals multiplied by orthogonal codes to the radio base station apparatus through a PUCCH. Performing user orthogonalization using CS and OCC concurrently makes it possible to improve the accuracy of orthogonalization and efficiently transmit ACK/NACK information through a PUCCH.

Embodiment 3

The present embodiment will describe a case where when transmission is performed through a PUCCH, signals from a plurality of users are identified using block spreading and an SRS (Sounding Reference Signal) as well as ACK/NACK signals which are feedback control information is transmitted.

In an LTE system, a mobile terminal apparatus transmits an SRS for scheduling and a radio base station apparatus measures an uplink channel condition for each mobile terminal apparatus to realize effective scheduling. The present embodiment will describe a case where the present invention is applied to a shortened format (SRS transmission format)

which is applied when an SRS and ACK/NACK signals are simultaneously transmitted (when the PUCCH format is a shortened format).

When the present invention is applied to the shortened format, the PUCCH format can be configured as follows.
(1) To maintain orthogonality of OCC, the sequence length of OCC is reduced (here, the sequence length of OCC is decremented by 1).
(2) To maintain the sequence length of OCC, RS symbol is deleted (here, one RS symbol is deleted).

FIG. 9A is a diagram illustrating the format relating to (1) above when the present invention is applied to the shortened format. This is a format in which when the subframe is an SRS transmission subframe (subframe in which other users may transmit SRS), the sequence length of OCC is reduced. That is, OCC whose sequence length is reduced is applied to the shortened format. As shown in FIG. 9A, for user #p (user who transmits an SRS), signal A in 1 SC-FDMA is duplicated and mapped to four SC-FDMA symbols (first symbol, third symbol to fifth symbol) and an SRS is mapped to the seventh symbol. Furthermore, all SC-FDMA symbols (first symbol, second symbol to fifth symbol) are multiplied by orthogonal codes (spreading codes) $Wp_1$ to $Wp_4$. On the other hand, for user #q (user who does not transmit any SRS), signal B in 1 SC-FDMA is duplicated and mapped to four SC-FDMA symbols (first symbol, third symbol to fifth symbol) and no signal is mapped to the seventh symbol (non-transmission section). Furthermore, all SC-FDMA symbols (first symbol, second symbol to fifth symbol) are multiplied by orthogonal codes (spreading codes) $Wq_1$ to $Wq_4$. The sequence length of OCC is thus reduced (here, the sequence length of OCC is decremented by 1).

In the orthogonal multiplexing method using block spreading, information as to which CS and OCC should be used for RS symbols may be preferably associated with a block spreading code of data symbols beforehand (implicit signaling) and CS and OCC may be determined based on block spreading codes of data symbols. That is, orthogonal codes by which data symbols are multiplied may be associated with cyclic shifts to be added to RS symbols and orthogonal codes multiplied.

The orthogonal multiplexing method using block spreading applies only OCC-based orthogonal multiplexing to data signals (data symbols) as shown in FIG. 9B (a plurality of time blocks that transmit data signals are multiplied by orthogonal codes) and applies orthogonal multiplexing using CS and OCC concurrently to reference signals (RS symbols) as shown in FIG. 9C. In FIG. 9B and FIG. 9C, the difference in shading represents the difference between users. Since the sequence length of OCC is decremented by 1 compared to the case in the above embodiment, as for data symbols, four users are multiplexed using OCC. On the other hand, as for RS symbols, since 12 CS resources×2 OCC resources are used, four users are multiplexed as shown, for example, in FIG. 9C. Furthermore, in this format, four users can be multiplexed every five CSs as shown in FIG. 9C. For this reason, it is possible to provide a greater maximum allowable amount of multipath delay and improve the accuracy of orthogonalization of RS symbols compared to the above embodiment. As a result, it is possible to improve the accuracy of channel estimation used for demodulation. By using the format used in FIG. 9A, it is possible to simultaneously transmit SRS and ACK/NACK signals and maintain orthogonality of OCC as well.

Figure 10:
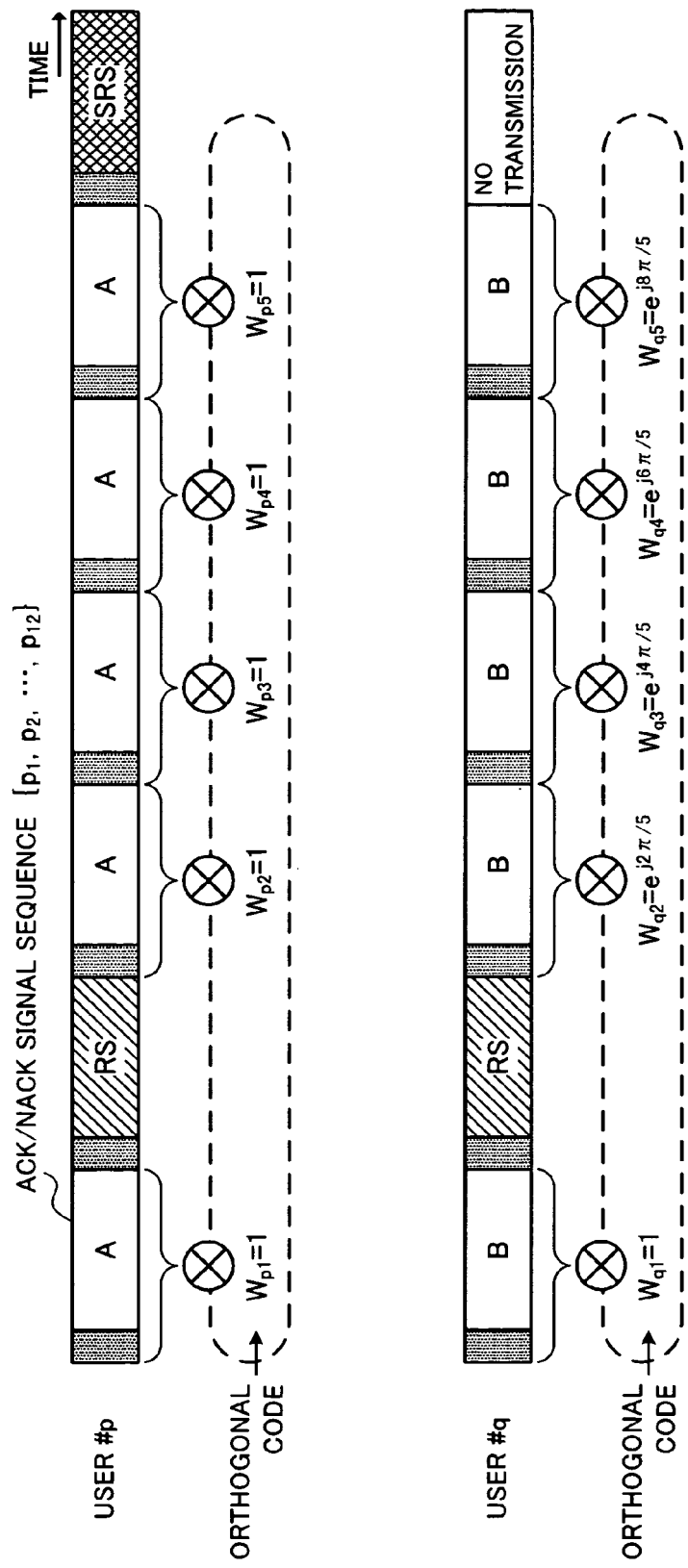
FIG. 10 is a diagram illustrating orthogonal multiplexing by block spreading in the mobile terminal apparatus according to Embodiment 3 of the present invention.

FIG. 10 is a diagram illustrating a format relating to (2) above when the present invention is applied to the shortened format. This is a format in which when the subframe is an SRS transmission subframe (subframe in which other users may transmit SRS), RS symbols are deleted. That is, a shortened format is used in which some RS blocks are deleted. As shown in FIG. 10, for user #p (user who transmits SRS), signal A in 1 SC-FDMA is duplicated, mapped to five SC-FDMA symbols (first symbol, third symbol to sixth symbol) and an SRS is mapped to the seventh symbol. Furthermore, all SC-FDMA symbols (first symbol, second symbol to sixth symbol) are multiplied by orthogonal codes (spreading codes) $Wp_1$ to $Wp_5$. On the other hand, for user #q (user who does not transmit any SRS), signal B in 1 SC-FDMA is duplicated and mapped to five SC-FDMA symbols (first symbol, third symbol to sixth symbol) and no signal is mapped to the seventh symbol (non-transmission section). Furthermore, all SC-FDMA symbols (first symbol, third symbol to sixth symbol) are multiplied by orthogonal codes (spreading codes) $Wq_1$ to $Wq_5$. RS symbols are thus deleted (here, one RS symbol is deleted).

In the orthogonal multiplexing method using block spreading, information as to which CS and OCC should be used for RS symbols may be preferably associated with block spreading codes of data symbols beforehand (implicit signaling), and CS and OCC may be determined based on the block spreading codes of data symbols. That is, orthogonal codes by which data symbols are multiplied may be associated with cyclic shifts to be added to RS symbols and orthogonal codes multiplied.

The orthogonal multiplexing method using this block spreading, as shown in FIG. 10, applies only OCC-based orthogonal multiplexing to data signals (data symbols) (a plurality of time blocks that transmit data signals are multiplied by orthogonal codes) and applies orthogonal multiplexing using CS to reference signals (RS symbols) as shown in FIG. 10. This format has one RS symbol fewer than the above embodiment, and thus performs orthogonal multiplexing using only 12 CS resources for RS symbols. Using the format used in FIG. 10 makes it possible to simultaneously transmit SRS and ACK/NACK signals, and maintain the sequence length of OCC as well.

Figure 11:
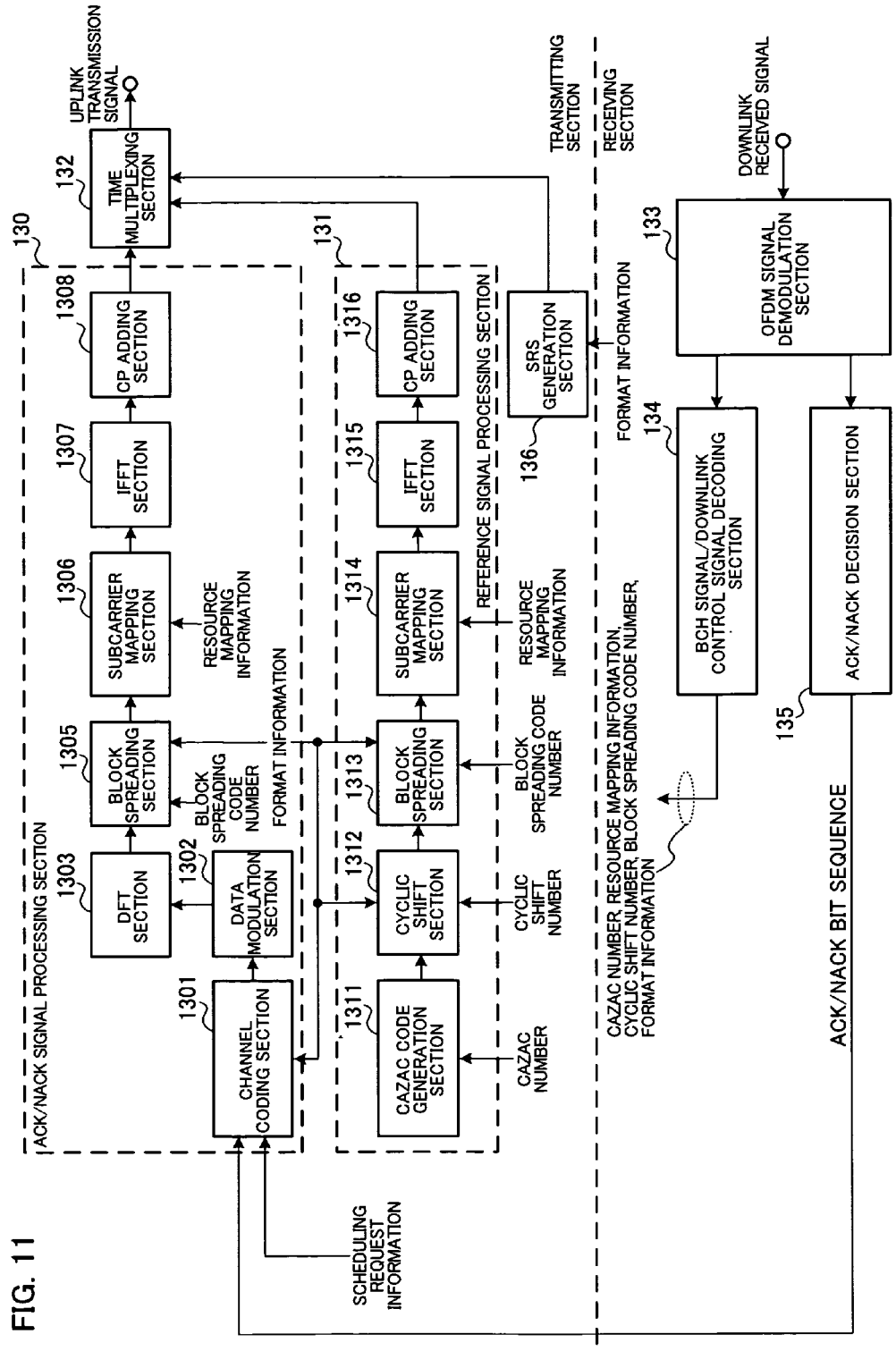
FIG. 11 is a diagram illustrating a schematic configuration of the mobile terminal apparatus according to Embodiment 3 of the present invention.

FIG. 11 is a diagram illustrating a schematic configuration of the mobile terminal apparatus according to Embodiment 3 of the present invention. In FIG. 11, parts identical to those in FIG. 8 are assigned the same reference numerals and detailed descriptions thereof will be omitted.

The mobile terminal apparatus shown in FIG. 11 is provided with an SRS generation section 136 that generates an SRS. Furthermore, in the mobile terminal apparatus shown in FIG. 11, format information is outputted from a BCH signal/downlink control signal decoding section 134 and this format information is inputted to a channel coding section 1301, block spreading sections 1305 and 1313, a cyclic shift section 1312 and the SRS generation section 136. Furthermore, scheduling request information is inputted to the channel coding section 1301. Here, the format information refers to information as to whether or not a shortened format is applied.

The channel coding section 1301 performs error correcting coding on an ACK/NACK bit sequence. The channel coding section 1301 performs error correcting coding by adding scheduling request information (1 bit) to the ACK/NACK bit sequence (data signal of PUCCH) according to the format information. That is, when the format information shows a shortened format, the channel coding section 1301 performs error correcting coding by adding scheduling request information (1 bit) to the ACK/NACK bit sequence (data signal of PUCCH). The channel coding section 1301 outputs the signal after the error correcting coding to a data modulation section 1302.

The cyclic shift section 1312 shifts a time-domain reference signal by a predetermined amount of cyclic shift. In this case, the cyclic shift sect ion 1312 shifts a time-domain reference signal by a predetermined amount of cyclic shift according to the format information. That is, the cyclic shift section 1312 cyclic-shifts the reference signals of the second symbol and sixth symbol in the format shown in FIG. 9A and cyclic-shifts the reference signal of the second symbol in the format shown in FIG. 10. The amount of cyclic shift differs from one user to another and is associated with the cyclic shift number. The cyclic shift section 1312 outputs the cyclic-shifted reference signals to the block spreading section 1313.

The block spreading sections (orthogonal code multiplying section) 1305 and 1313 multiply a time-domain signal by a block spreading code. In this case, the block spreading sections 1305 and 1313 multiply the time-domain signal by the block spreading code according to the format information. That is, the block spreading section 1305 assigns the block spreading codes shown in FIG. 9B to four users in the format shown in FIG. 9A and assigns the block spreading codes shown in FIG. 5A to five users in the format shown in FIG. 10. The block spreading code differs from one user to another and is associated with a block spreading code number. Furthermore, the block spreading sect ion 1313 multiplies the cyclic-shifted reference signal by a block spreading code (orthogonal code (OCC) ({1,1}, {1,−1})). Here, for OCCs used for reference signals, it is preferable to use OCCs associated with the block spreading codes of data symbols beforehand. The block spreading sections 1305 and 1313 output their respective block-spread signals to subcarrier mapping sections 1306 and 1314.

The SRS generation section 136 generates an SRS and outputs the SRS to a time multiplexing section 132. In this case, the SRS generation section 136 generates an SRS according to the format information. That is, the SRS generation section 136 generates an SRS when the format information indicates a shortened format.

Figure 12:
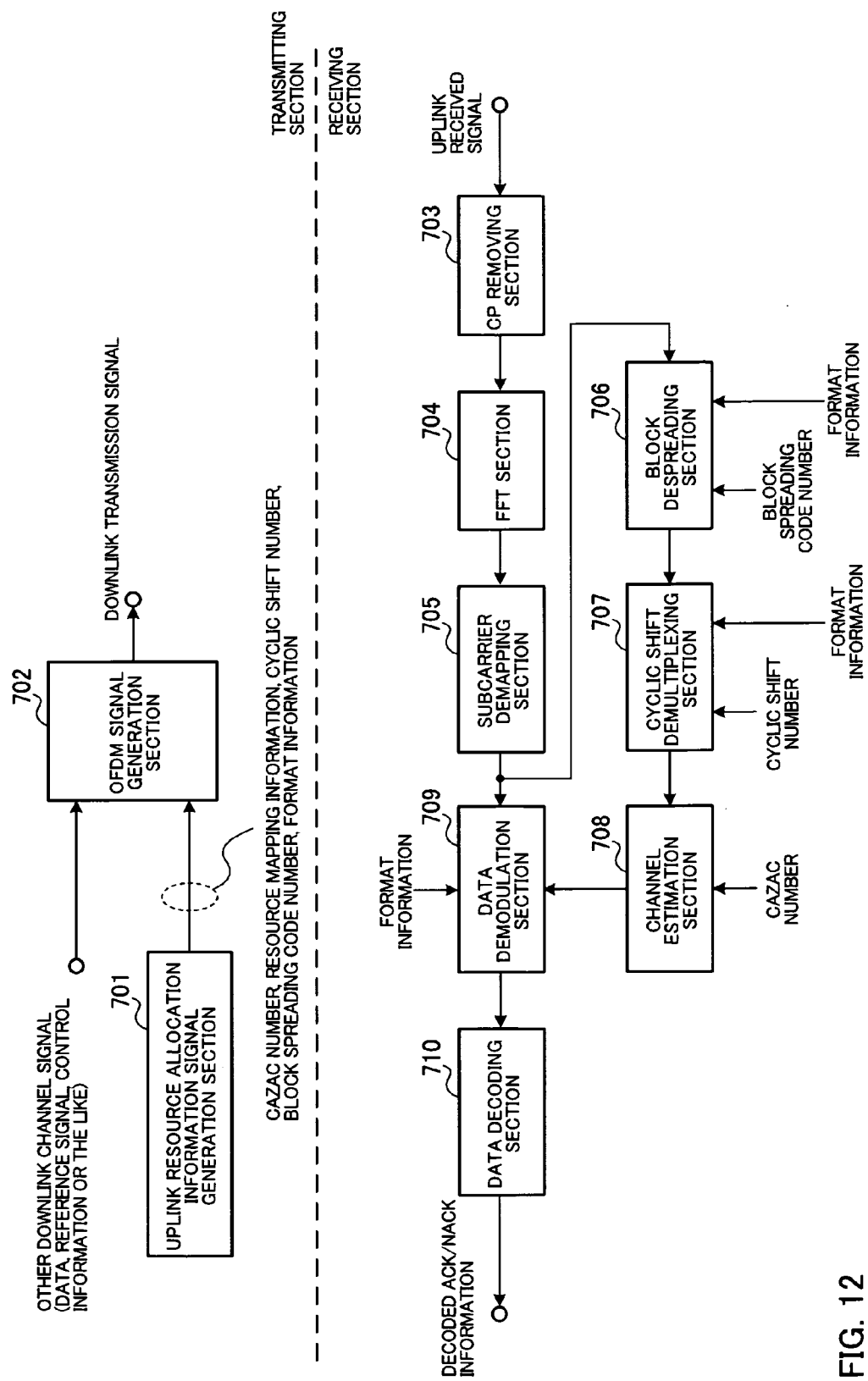
FIG. 12 is a diagram illustrating a schematic configuration of a radio base station apparatus according to Embodiment 3 of the present invention.

FIG. 12 is a diagram illustrating a schematic configuration of the radio base station apparatus according to Embodiment 3 of the present invention. In FIG. 12, parts identical to those in FIG. 7 are assigned the same reference numerals as those in FIG. 7, and therefore detailed descriptions thereof will be omitted.

The radio base station apparatus shown in FIG. 12 transmits format information to the mobile terminal apparatus as a downlink transmission signal. This format information is inputted to a block despreading section 706, a cyclic shift demultiplexing section 707 and a data demodulation section 709.

The block despreading section 706 despreads a received signal subjected to block spreading, that is, orthogonally multiplexed using orthogonal codes (OCCs) (block spreading codes) using orthogonal codes ({1,1}, {1,−1}) used in the mobile terminal apparatus. In this case, the block despreading section 706 despreads the received signal orthogonally multiplexed using orthogonal codes according to format information. That is, the block despreading section 706 despreads the received signal orthogonally multiplexed using the block spreading codes shown in FIG. 9B in the format shown in FIG. 9A and despreads the received signal orthogonally multiplexed using the block spreading codes shown in FIG. 5A in the format shown in FIG. 10. The block despreading section 706 outputs the despread signal to the cyclic shift demultiplexing section 707.

The cyclic shift demultiplexing section 707 demultiplexes control signals orthogonally multiplexed using cyclic shifts, using cyclic shift numbers. An uplink control channel signal from the mobile terminal apparatus is cyclic-shifted by an amount of cyclic shift differing from one user to another. Therefore, by performing cyclic shifts in a reverse direction by the same amount of cyclic shift as the amount of cyclic shift performed in the mobile terminal apparatus, it is possible to demultiplex the control signal of the user as the target of reception processing. In this case, the cyclic shift demultiplexing section 707 performs demultiplexing using a cyclic shift number according to the format information. That is, the cyclic shift demultiplexing section 707 cyclic-shifts the reference signals of the second symbol and sixth symbol in the reverse direction in the format shown in FIG. 9A and cyclic-shifts the reference signal of the second symbol in the reverse direction in the format shown in FIG. 10. The cyclic shift section 707 outputs the user-demultiplexed signals to a channel estimation section 708.

The data demodulation section 709 data-demodulates ACK/NACK signals and outputs the demodulated ACK/NACK signals to a data decoding section 710. In this case, the data demodulation section 709 performs data demodulation based on a channel estimate value from the channel estimation section 708. The data demodulation section 709 data-demodulates the ACK/NACK signal according to the format information. That is, the data demodulation section 709 data-demodulates the ACK/NACK signal based on the formats shown in FIG. 9A and FIG. 10. In the case of a shortened format, the data demodulation section 709 data-demodulates scheduling request information. The data demodulation section 709 outputs the data-demodulated signal to the data decoding section 710.

The mobile terminal apparatus in the above-described configuration adds cyclic shifts to reference signals in an ACK/NACK PUCCH format and multiplies the reference signals by orthogonal codes. The reference signals are thus user-multiplexed as shown in FIG. 9C. The mobile terminal apparatus transmits a control channel signal with cyclic shifts added and including reference signals multiplied by orthogonal codes to the radio base station apparatus through a PUCCH. By performing user orthogonalization using CS and OCC concurrently, it is possible to transmit an SRS in a shortened format, improve the accuracy of orthogonalization and efficiently transmit ACK/NACK information through a PUCCH.

The present invention can be implemented modified in the number of processing sections and processing procedures as appropriate in the above description without departing from the scope of the present invention. The elements illustrated in the drawings represent functions, and the respective function blocks may be implemented by hardware or by software. Other aspects may be implemented modified as appropriate without departing from the scope of the present invention.

The present application is based on Japanese Patent Application No. 2010-105944 filed on Apr. 30, 2010, Japanese Patent Application No. 2010-181683 filed on Aug. 16, 2010 and Japanese Patent Application No. 2010-225014 filed on Oct. 4, 2010, entire content of which is expressly incorporated by reference herein.

The invention claimed is:

1. A mobile terminal apparatus transmitting ACK/NACK control information and reference signals using a physical uplink control channel format comprised of a plurality of time blocks, the mobile terminal apparatus comprising:

a cyclic shift section configured to add cyclic shifts to a plurality of reference signal blocks out of the plurality of time blocks; and a block spreading section configured to multiply the plurality of reference signal blocks by a first orthogonal code in a first group of orthogonal codes and to multiply a plurality of ACK/NACK control information blocks out of the plurality of time blocks by a second orthogonal code in a second group of orthogonal codes, wherein the cyclic shift section determines the cyclic shifts, which are added to the plurality of reference signal blocks, based on the second orthogonal code in the second group of orthogonal codes by which the plurality of ACK/NACK control information blocks are multiplied.

2. The mobile terminal apparatus according to claim 1, wherein the physical uplink control channel format is a shortened format where one symbol is deleted in an SRS (Sounding Reference Signal) transmission subframe.

3. The mobile terminal apparatus according to claim 2, wherein the second group of orthogonal codes whose sequence length are reduced is applied to the shortened format.

4. The mobile terminal apparatus according to claim 3, wherein in the SRS transmission subframe, the plurality of ACK/NACK control information blocks are mapped to the first symbol and the third symbol to the fifth symbol, and the plurality of reference signal blocks are mapped to the second symbol and the sixth symbol.

5. The mobile terminal apparatus according to claim 1, further comprising:
an ACK/NACK decision section configured to generate a plurality of ACK/NACK control bits which make up the ACK/NACK control information,
wherein the ACK/NACK control information is control information for downlink shared data channel in a plurality of component carriers.

6. The mobile terminal apparatus according to claim 5, further comprising:
a channel coding section configured to perform channel coding on the plurality of ACK/NACK control bits; and
a DFT section configured to apply DFT (Discrete Fourier Transform) to the channel-coded signal.

7. The mobile terminal apparatus according to claim 6, wherein the plurality of ACK/NACK control information blocks are mapped to the first symbol, the third symbol to the fifth symbol, and the seventh symbol, and the plurality of reference signal blocks are mapped to the second symbol and the sixth symbol.

8. A radio communication method for a mobile terminal apparatus transmitting ACK/NACK control information and reference signals using a physical uplink control channel format comprised of a plurality of time blocks, the radio communication method comprising the steps of:
adding cyclic shifts to a plurality of reference signal blocks out of the plurality of time blocks; and
multiplying the plurality of reference signal blocks by a first orthogonal code in a first group of orthogonal codes and multiplying a plurality of ACK/NACK control information blocks out of the plurality of time blocks by a second orthogonal code in a second group of orthogonal codes,
wherein the cyclic shifts are determined based on the second orthogonal code in the second group of orthogonal codes by which the plurality of ACK/NACK control information blocks are multiplied.

9. The radio communication method according to claim 8, wherein the physical uplink control channel format is a shortened format where one symbol is deleted in an SRS (Sounding Reference Signal) transmission subframe.

10. A radio communication system comprising:
a radio base station apparatus; and
a mobile terminal apparatus transmitting, to the radio base station apparatus, ACK/NACK control information and reference signals using a physical uplink control channel format comprised of a plurality of time blocks, wherein the mobile terminal apparatus has:
a cyclic shift section configured to add cyclic shifts to a plurality of reference signal blocks out of the plurality of time blocks; and
a block spreading section configured to multiply the plurality of reference signal blocks by a first orthogonal code in a first group of orthogonal codes and to multiply a plurality of ACK/NACK control information blocks out of the plurality of time blocks by a second orthogonal code in a second group of orthogonal codes, and
the cyclic shift section determines the cyclic shifts, which are added to the plurality of reference signal blocks, the cyclic shifts that are determined based on the second orthogonal code in the second group of orthogonal codes by which the plurality of ACK/NACK control information blocks are multiplied.

11. The radio communication system according to claim 10, wherein the physical uplink control channel format is a shortened format where one symbol is deleted in an SRS (Sounding Reference Signal) transmission subframe.

* * * * *